Patented Apr. 15, 1952

2,593,008

UNITED STATES PATENT OFFICE 2,593,008

FOAMED GYPSUM COMPOSITION

Fred L. Chappell, Jr., Kalamazoo, Mich., assignor to Hercules Powder Company, Wilmington, Del., a corporation of Delaware No Drawing. Application April 13, 1950, Serial No. 155,790

12 Claims. (Cl. 106—88)

This invention relates to a foamed gypsum composition wherein the degree and stability of foaming are improved yielding a final product having a substantially decreased bulk density.

In the manufacture of structural materials such as particularly, gypsum wall board, it is highly desirable to produce a final composition having a low bulk density without prolonging the time required for setting. The various reasons for this are, of course, the fact that the lighter product is easier to handle in construction operations and, in addition, the lighter product containing substantial quantities of air entrained therein has a higher insulating value and other improved properties, without apparent impairment of structural strength and the like.

Now in accordance with the present invention, a gypsum wall board of improved properties and substantially decreased bulk density is prepared by incorporating therein small quantities of a combination foaming agent comprising an alkali metal salt of a resin hereinafter defined together with a mono- or dihydroxy lower alcohol. Among suitable ingredients for the combination with gypsum are the sodium and potassium salts of the resin together with lower alcohols such as hexylene glycol, furfuryl alcohol, isopropanol, and tertiary and secondary butyl alcohols, dipropylene glycol and the like. The alcohol may be defined as being water-soluble, containing 3 to 6 carbon atoms, and having a ratio of hydroxyl groups to carbon atoms up to but not in excess of one hydroxyl group per three carbon atoms and a total oxygen content below 40%, including nonhydroxyl oxygen.

The resin employed is a partially gasoline-insoluble pine wood resin in the form of its soap, for example, potassium or sodium soap, which is blended with the lower alcohol and then incorporated into an aqueous slurry of calcined gypsum in the amount of a fraction of 1% of the total composition and preferably between about 0.005 and about 0.05%, based on the weight of the calcined gypsum. In the preferred range of the invention, to achieve results most suitable for commercial operation, the combination foaming agent is employed in an amount between about 0.01 and about 0.03%. Similarly, the relative proportions of the resin soap and the alcohol for optimum commercial performance will be between about 1 and about 4 parts resin soap per part of alcohol, generally about 2 parts resin soap and 1 part alcohol. The resulting aqueous composition is characterized by a degree of foaming beyond that achievable through separate use of the ingredients of the foaming blend. The blend of two parts resin soap and one part hexylene glycol as particularly contemplated according to this invention is further characterized by excellent fluidity over a wide range of temperature down to −5° C., freedom from inflammable and toxic vapors and a superior foaming efficiency.

The general nature and scope of the invention having been set forth, the following example is presented in illustration but not in limitation of

Example

An aqueous mixture was prepared of 100 parts of calcined gypsum, 106 parts of water and 0.012%, based on total solids, of a blend in the proportion of two parts of the potassium soap of a partially gasoline-insoluble pine wood resin for each one part of hexylene glycol (2-methyl-2,4-pentane diol). The aqueous mixture was placed in a vessel equipped with a high speed agitator and was agitated therein for 15 seconds after which time the volume of the composition was determined. Inasmuch as the aging of the gypsum material caused slight variation in the test results, each composition was compared with a simultaneously run control sample containing a comparative foaming agent.

The test procedure was repeated with three levels of amounts of foaming agents consisting of a blend of potassium soap of the resin with hexylene glycol and isopropanol and with the resin soap and the lower alcohol separately employed. The results of the tests in comparison with control samples are set forth in the table.

| | Per Cent Resin Soap | Per Cent Alcohol | Volume After Agitating |
|---|---|---|---|
| 1. | 0.008 | 0.004 Hexylene Glycol | 145 |
| 2. | 0.012 | 0.006 Hexylene Glycol | 155 |
| 3. | 0.016 | 0.008 Isopropanol | 155 |
| 4. | control, 0.012 Resin Soap | No alcohol | 137 |
| 5. | control, 0.046 Resin Soap | No alcohol | 150 |
| 6. | No Resin Soap | 0.006 Hexylene Glycol | (¹) |

¹ Substantially no foaming.

The resin whose soap is employed as one ingredient of this combination is a naturally occurring pine resin obtained as a by-product in the separation of wood rosin from a crude pine resin extract or in the further refining of a dark-colored wood rosin to a light-colored product. For example, a preferred resin is characterized by being dark in color and by being partially insoluble in gasoline and petroleum solvents, soluble to an extent of between about 20% and 70%, in gasoline, generally to an extent of about 40%. It may typically be prepared by separation between furfural and gasoline of a partially purified wood rosin, known as FF wood rosin, whereby the partially gasoline-insoluble resin of the invention is recovered from the furfural solvent layer. The resin and the alcoholic fraction of the composition may be blended prior to saponification of the resin, but the presently contemplated form of the invention employs a blend of the preformed resin soap with the alcohol.

With reference to the data in the table, it is to be noted that the effectiveness of the foam-producing ingredients taken in combination is significantly greater than the separate effectiveness thereof. In particular, it is observed that the alcohol employed imparts substantially no foaming characteristics to the calcined gypsum composition in the absence of the soap of the resin but is effective only in combination therewith, and that the amount of the resin soap required for similar volume of foam in the absence of the alcohol is roughly four times that required when in combination with the alcohol.

As is apparent to those skilled in the art, the composition of calcined gypsum, the resin soap, and the lower alcohol in aqueous mixture is further formulated and fashioned according to methods conventional in this art. The composition may be combined as desired with additional additives and components to increase its structural strength, water-resistance or the like or to add to the other desirable properties. These products and their form and structure are well known in the art and variations in and according to the invention within such skill and normal practice will be readily apparent.

What I claim and desire to protect by Letters Patent is:

1. A foaming gypsum composition comprising an aqueous suspension of calcined gypsum containing a fraction of 1% of a blend of an alkali metal soap of a partially gasoline-insoluble pine wood resin and a water-soluble lower alcohol having 3 to 6 carbon atoms, having a ratio of hydroxyl groups to carbon atoms up to but not in excess of 1 hydroxyl group per 3 carbon atoms, and having a total oxygen content below 40%.

2. A foaming gypsum composition comprising an aqueous suspension of calcined gypsum containing between about 0.01% and about 0.03%, based on the gypsum, of a blend of an alkali metal soap of a partially gasoline-insoluble pine wood resin and a water-soluble lower aliphatic alcohol having a carbon chain of 3 to 6 carbon atoms, having a ratio of hydroxyl groups to carbon atoms up to but not in excess of 1 hydroxyl group per 3 carbon atoms, and having a total oxygen content below 40%.

3. A foaming gypsum composition comprising an aqueous suspension of calcined gypsum containing a fraction of 1% of a blend of hexylene glycol and an alkali metal soap of a partially gasoline-insoluble pine wood resin.

4. A foaming gypsum composition comprising an aqueous suspension of calcined gypsum containing a fraction of 1% of a blend of isopropanol and an alkali metal soap of a partially gasoline-insoluble pine wood resin.

5. A foaming gypsum composition comprising an aqueous suspension of calcined gypsum containing a fraction of 1% of a blend of tertiary butyl alcohol and an alkali metal soap of a partially gasoline-insoluble pine wood resin.

6. A foaming gypsum compositon comprising an aqueous suspension of calcined gypsum containing a fraction of 1% of a blend of hexylene glycol and a potassium soap of a partially gasoline-insoluble pine wood resin.

7. A foaming gypsum composition comprising an aqueous suspension of calcined gypsum containing a fraction of 1% of a blend of isopropanol and a potassium soap of a partially gasoline-insoluble pine wood resin.

8. A foaming gypsum composition comprising an aqueous suspension of calcined gypsum containing a fraction of 1% of a blend of tertiary butyl alcohol and a potassium soap of a partially gasoline-insoluble pine wood resin.

9. A foaming gypsum composition comprising an aqueous suspension of calcined gypsum containing a fraction of 1% of a blend of hexylene glycol and a sodium soap of a partially gasoline-insoluble pine wood resin.

10. A foaming gypsum composition comprising an aqueous suspension of calcined gypsum containing a fraction of 1% of a blend of isopropanol and a sodium soap of a partially gasoline-insoluble pine wood resin.

11. A foaming gypsum composition comprising an aqueous suspension of calcined gypsum containing a fraction of 1% of a blend of tertiary butyl alcohol and a sodium soap of a partially gasoline-insoluble pine wood resin.

12. A foaming gypsum composition comprising an aqueous suspension of calcined gypsum containing a fraction of 1% of a blend of about two parts tertiary butyl alcohol and about one part of a potassium soap of a partially gasoline-insoluble pine wood resin.

FRED L. CHAPPELL, JR.

REFERENCES CITED

The following references are of record in the file of this patent:

UNITED STATES PATENTS

| Number | Name | Date |
| --- | --- | --- |
| 2,089,813 | Rice | Aug. 10, 1937 |
| 2,207,339 | Camp | July 9, 1940 |
| 2,360,518 | Scripture | Oct. 17, 1944 |
| 2,364,555 | Scripture | Dec. 5, 1944 |
| 2,371,688 | Gold | Mar. 20, 1945 |

FOREIGN PATENTS

| Number | Country | Date |
| --- | --- | --- |
| 39,942 | Germany | of 1887 |
| 350,538 | Great Britain | of 1931 |